United States Patent
Barnwell

(10) Patent No.: US 10,525,388 B2
(45) Date of Patent: Jan. 7, 2020

(54) MULTI-CARTRIDGE FILTER ADAPTER AND INTERFACE SYSTEM AND METHOD

(71) Applicant: SPX FLOW TECHNOLOGY USA, INC., Ocala, FL (US)

(72) Inventor: James W. Barnwell, Moravian Falls, NC (US)

(73) Assignee: SPX Flow Technology USA, Inc., Ocala, FL (US)

( * ) Notice: Subject to any disclaimer, the term of this patent is extended or adjusted under 35 U.S.C. 154(b) by 438 days.

(21) Appl. No.: 14/451,796

(22) Filed: Aug. 5, 2014

(65) Prior Publication Data

US 2016/0038862 A1  Feb. 11, 2016

(51) Int. Cl.
*B01D 35/30* (2006.01)
*B01D 27/08* (2006.01)
(Continued)

(52) U.S. Cl.
CPC .......... *B01D 35/306* (2013.01); *B01D 35/30* (2013.01); *B01D 46/0005* (2013.01); *B01D 46/2407* (2013.01); *B01D 46/2414* (2013.01); B01D 29/23 (2013.01); B01D 29/52 (2013.01); B01D 2201/0446 (2013.01); B01D 2201/295 (2013.01); B01D 2201/304 (2013.01); B01D 2201/305 (2013.01); B01D 2201/4053 (2013.01); B01D 2201/4076 (2013.01); B01D 2265/021 (2013.01); B01D 2265/026 (2013.01)

(58) Field of Classification Search
None
See application file for complete search history.

(56) References Cited

U.S. PATENT DOCUMENTS 4,719,012 A * 1/1988 Groezinger ............ B01D 27/08
210/232
4,859,328 A * 8/1989 Groezinger ............ B01D 27/08
210/232
(Continued)

FOREIGN PATENT DOCUMENTS

CN  201192609 Y  2/2009
DE  41 26 320 A1  2/1993
(Continued)

OTHER PUBLICATIONS

Translated Japanese Office Action dated Jan. 10, 2017.
(Continued)

*Primary Examiner* — Thomas M Lithgow
(74) *Attorney, Agent, or Firm* — BakerHostetler

(57) ABSTRACT

An attaching system for a filter cartridge may include: a top cap configured to attach to a filter cartridge; a mating projection located on the top cap; at least one locking projection projecting radially away from the mating projection; and a base portion defining an annularly shaped flat surface surrounding the mating projection on a first side and configured to attach to the filter cartridge on a second side. A method of attaching a filter cartridge to a filter assembly may include: providing locking projections on a top cap of a filter cartridge; locating a spring around a mating projection of the top cap; forming annular groove between the spring and the locking projections; and configuring the top cap to a portion of the filter cartridge.

9 Claims, 9 Drawing Sheets

(51) Int. Cl.
   *B01D 46/00*   (2006.01)
   *B01D 46/24*   (2006.01)
   *B01D 29/23*   (2006.01)
   *B01D 29/52*   (2006.01)

(56) References Cited

U.S. PATENT DOCUMENTS

| | | | |
|---|---|---|---|
| 6,739,459 B1 * | 5/2004 | Hartmann | B01D 29/111 |
| | | | 210/457 |
| 2002/0100721 A1 * | 8/2002 | Huxtable | C02F 1/003 |
| | | | 210/323.2 |
| 2002/0144938 A1 | 10/2002 | Hawkins et al. | |
| 2002/0153297 A1 * | 10/2002 | Bozenmayer | B01D 29/114 |
| | | | 210/232 |
| 2005/0000886 A1 | 1/2005 | Reynolds et al. | |
| 2005/0236316 A1 * | 10/2005 | Gould | B01D 29/23 |
| | | | 210/232 |
| 2007/0227959 A1 * | 10/2007 | Sinur | B01D 29/96 |
| | | | 210/232 |
| 2012/0261325 A1 | 10/2012 | Brown et al. | |
| 2014/0183118 A1 | 7/2014 | Marks | |

FOREIGN PATENT DOCUMENTS

| | | |
|---|---|---|
| DE | 44 21 024 C1 | 10/1995 |
| EP | 0 483 119 A2 | 4/1992 |
| JP | 3-119413 U | 12/1991 |
| JP | H05-269322 A | 10/1993 |
| JP | H10-71306 A | 3/1998 |
| JP | 2000-110547 A | 4/2000 |
| WO | 83/01012 A1 | 3/1983 |
| WO | 93/02765 A1 | 2/1993 |
| WO | 2008/082065 A1 | 7/2008 |
| WO | 2009/041493 A1 | 4/2009 |
| WO | 2012/143793 A1 | 10/2012 |

OTHER PUBLICATIONS

Second Office Action issued in Chinese Patent Application No. 201510472692.4 dated May 4, 2018, with English translation.

European Search Report issued in European Patent Application No. 15 179 578.8 dated Jan. 26, 2018.

* cited by examiner

MULTI-CARTRIDGE FILTER ADAPTER AND INTERFACE SYSTEM AND METHOD

FIELD OF THE INVENTION

The present invention relates generally to gas or liquid filter assemblies. More particularly, the present invention relates to an apparatus and method for attaching new or replacement filter cartridges in a gas filter assembly.

BACKGROUND OF THE INVENTION

Gas or liquid filter assemblies often use filter media for filtering a gas or liquid. During the filtering operations, the filter media may become saturated with particulates or other impurities that block the media and result in an increase in pressure loss across the media. Once the filter media reaches a certain pressure drop, it is necessary to replace the filter cartridge with a new one to keep the pressure loss to a minimum. Current methods use a threaded rod commonly known as a tie rod to attach the filter cartridge to the attaching plate (vessel seal plate) along with a gasket or O-ring for sealing the cartridge to the attaching plate or use a spider on the bottom end cap to secure the filter cartridges in place.

Changing the filter media in a gas or liquid filtration system contains drawbacks. For example, the time it takes to change the filter media results in the filtering system being unavailable for gas filtering. Further, the filter media must be changed with care to ensure that filtered and unfiltered gas or liquid do not mix during and/or after the change.

In order to provide a fast, efficient, and secure way of changing the filter media, filter cartridges may be used. In using filter cartridges, care should be taken in order to ensure that the filter cartridge is properly installed and sealed so that unfiltered gas or liquid does not mix with the filtered gas in the filter assembly. In some instances, large amounts of gas or liquid may be desired to be filtered. In such instances the filter assembly may use multiple filter cartridges in parallel for filtering a gas or liquid.

Accordingly, it is desirable to provide a filter cartridge attaching system that is an improvement over the prior art. Improved systems may be fast, easy to use, relatively inexpensive, and can be installed in a sealed manner to avoid mixture of filtered and unfiltered gas or liquid.

SUMMARY OF THE INVENTION

The foregoing needs are met, to a great extent, by the present invention, wherein in one aspect a filtering system and method is provided that in some embodiments may be fast and easy to use, relatively inexpensive, and can be installed in a sealed manner to avoid mixture of filtered and unfiltered gas or liquid.

In accordance with one embodiment of the present invention, an attaching system for a filter cartridge may include: a top cap configured to attach to a filter cartridge; a mating projection located on the top cap; at least one locking projection projecting radially away from the mating projection; and a base portion defining an annularly shaped flat surface surrounding the mating projection on a first side and configured to attach to the filter cartridge on a second side.

In accordance with another embodiment of the present invention, a method of attaching a filter cartridge to a filter assembly may include: providing locking projections on a top cap of a filter cartridge; locating a spring around a mating projection of the top cap; forming annular groove between the spring and the locking projections; and configuring the top cap to a portion of the filter cartridge.

In accordance with yet another embodiment of the present invention, an attaching system for a filter cartridge may include: a top cap configured to attach to a filter cartridge; a mating projection located on the top cap; means for locking the top cap to a locking plate projecting radially away from the mating projection; and means for attaching the top cap to a filter cartridge having base portion defining an annularly shaped flat surface surrounding the mating projection on a first side and configured to attach to the filter cartridge on a second side.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
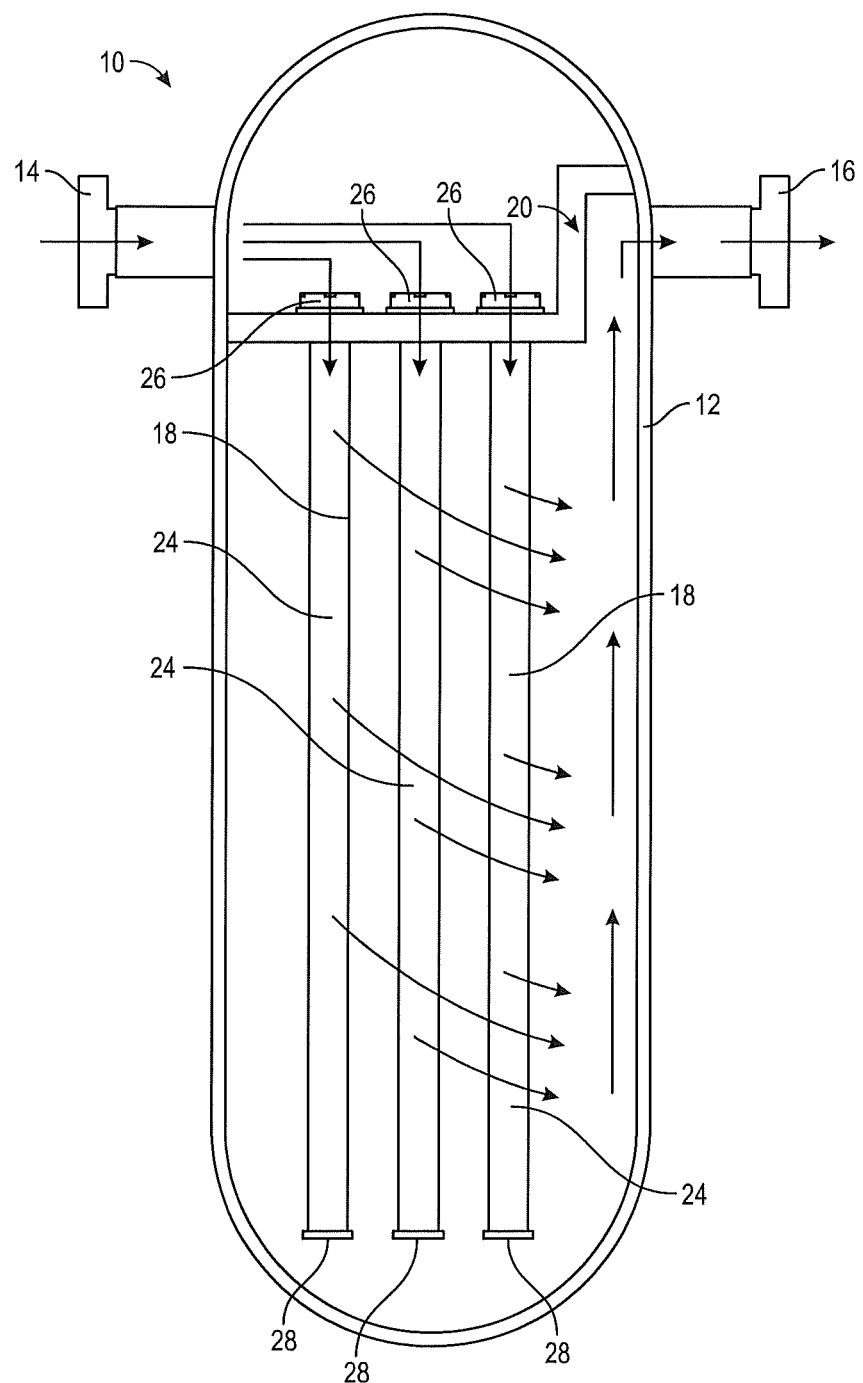
FIG. 1 is a cross-sectional view of a gas or liquid treatment assembly showing a gas treatment assembly including a housing containing several filter cartridges in accordance with one embodiment of the present disclosure.

The various embodiments will now be described with reference to the drawing figures, in which like reference numerals refer to like parts throughout. An embodiment in accordance with the present invention provides a filtering system and method that may be fast and easy to use, relatively inexpensive, and can be installed in a sealed manner to avoid mixture of filtered and unfiltered gas.

An embodiment of the present inventive apparatus is illustrated in FIG. 1. A gas or liquid treatment assembly 10 is shown in cross-section so the internal components and gas or liquid flow directions may be seen. The gas or liquid treatment assembly 10 includes a housing 12 having an inlet 14 to receive unfiltered gas or liquid such as, for example, air and an outlet 16 for outletting the filtered gas or liquid. The arrows illustrated in FIG. 1 illustrate the general direction of travel according to an embodiment in accordance with the present disclosure.

Multiple filter cartridges 18 are contained within the housing 12. The multiple filter cartridges 18 are attached to a sealing and/or attaching plate 20 located within the housing 12. The cartridge attaching plate 20 not only secures the filter cartridges 18 but also provides a barrier separating filtered and unfiltered gas or liquid. Various embodiments can be sized to contain different numbers of filter cartridges 18 in order to achieve a desired filter capacity. In the example shown in FIG. 1, unfiltered air enters the inlet 14 and flows into the filter cartridges 18 through a top opening in the top cap 26 shown, for example, in FIGS. 6 and 7 of the filter cartridges 18. The gas or liquid flows through the permeable sides 24 of the filter cartridges 18. The permeable sides 24 may include filter media so that when the gas flows through the permeable sides 24, the gas becomes filtered. After flowing through the permeable sides 24, the gas flows out of the housing 12 through an outlet 16. After reviewing this disclosure, one of ordinary skill in the art would understand that in other embodiments the airflow may be reversed. In other words, a gas may come through the filter media or permeable sides 24 from the outside and then purified gas would flow through the center of the filter cartridge 18 through the hole in the top cap 26.

The filter cartridges 18 include a top cap 26 which attaches to the cartridge attaching plate 20 in a manner illustrated and described in more detail further below. The filter cartridge 18 also contains a bottom cap 28. The filter media (permeable sides 24) is located between the top cap 26 and the bottom cap 28.

Figure 2:
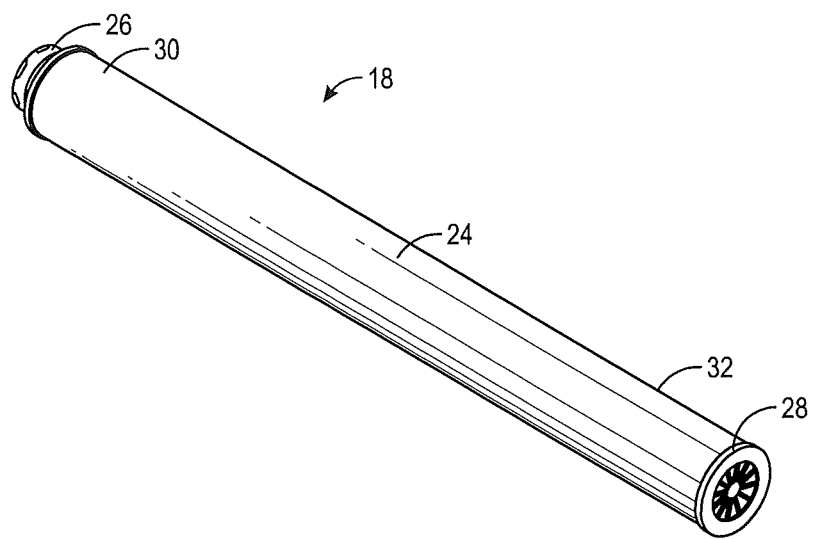
FIGS. 2 and 3 are isometric views of a filter cartridge in accordance with an embodiment.
Figure 3:
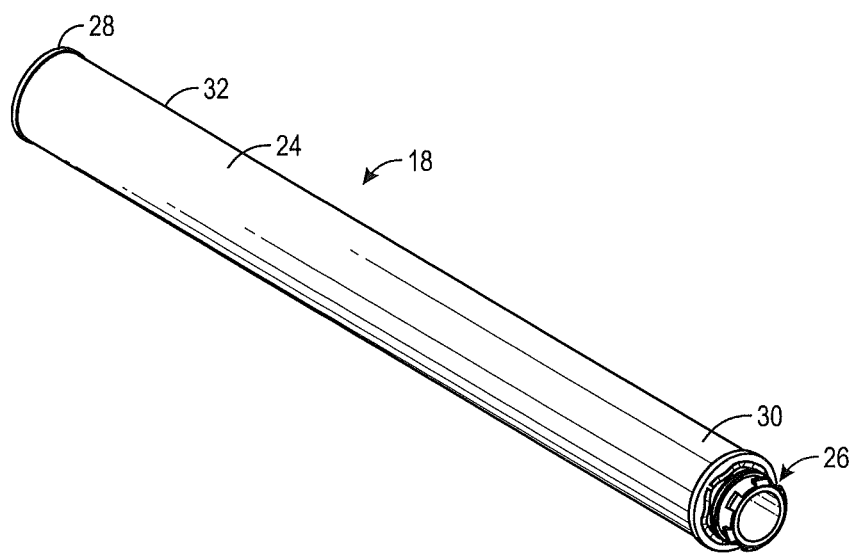

FIGS. 2 and 3 are perspective views from different angles of a filter cartridge 18 in accordance with an embodiment. Filter cartridge 18 includes a top cap 26 located at a top 30 of the filter cartridge 18. A bottom cap 28 is located at the bottom and 32 of the filter cartridge 18. Both the top cap 26 and the bottom cap 28 are attached to the permeable sides 24 which, as explained above, may include filter media. The top 26 and bottom caps 28 may be made of plastic, metal, such as aluminum, or any other suitable material.

Figure 4:
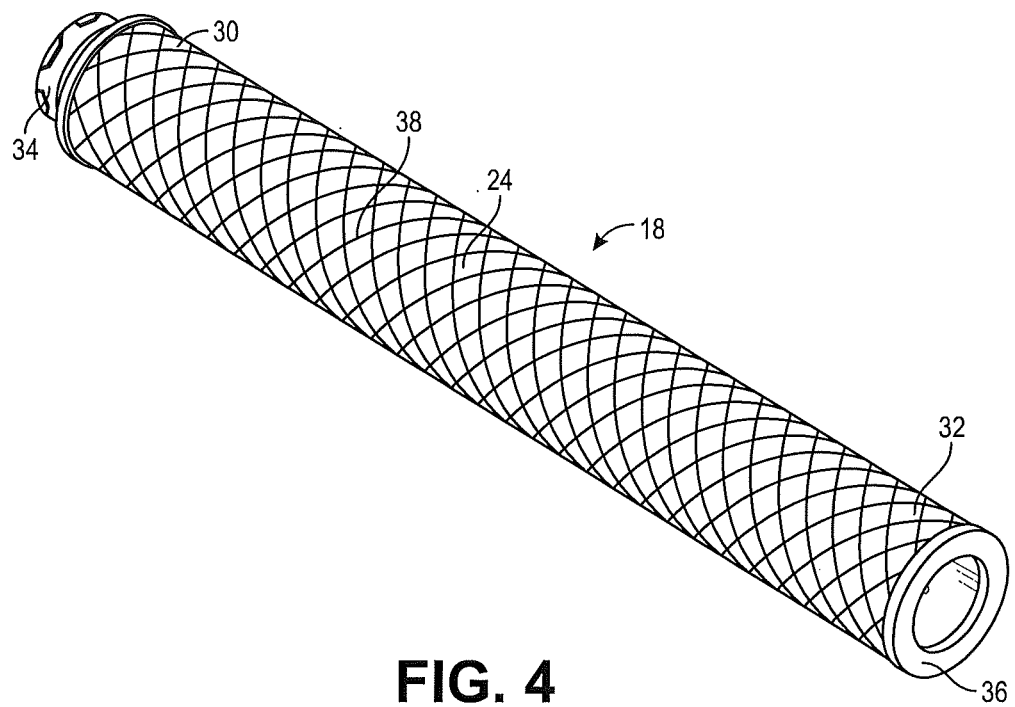
FIGS. 4 and 5 are isometric views of a filter cartridge in accordance with another embodiment.
Figure 5:
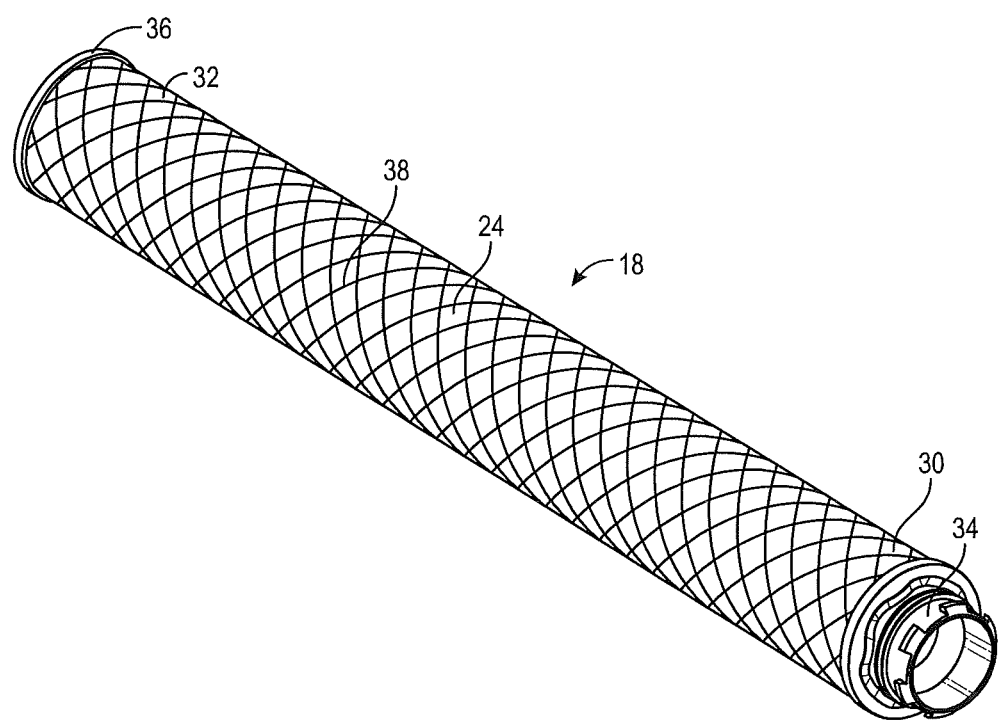

FIGS. 4 and 5 illustrate perspective views taken from different angles of a second embodiment in accordance of the present disclosure. The filter cartridge 18 includes a top cap 34 and a bottom cap 36 located at a top and 30 and a bottom and 32 of the filter cartridge 18. The top 34 and bottom caps 36 may be made of aluminum. While the caps 26, 28, 34, and 36 are described herein as either plastic or aluminum, one of ordinary skill in the art would understand that these are meant to be examples not limitations of what materials the caps 26, 28, 34, and 36 can be made of. Any suitable material may be used in accordance with the present disclosure. As the permeable sides 24 in the embodiment shown in FIGS. 4 and 5 may include the added feature of netting 38 which can help contain the permeable sides 24.

Figure 6:
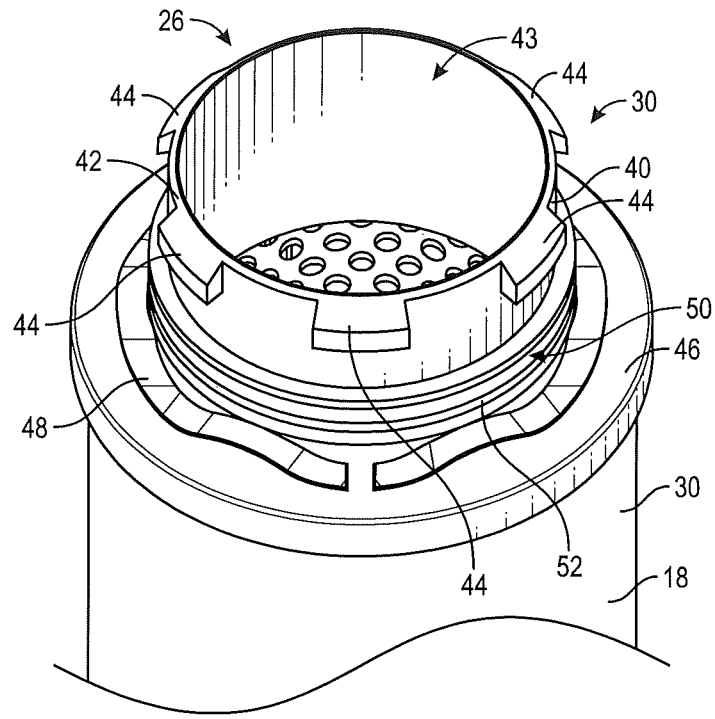
FIG. 6 is an isometric view of a top cap in accordance with one embodiment.
Figure 7:
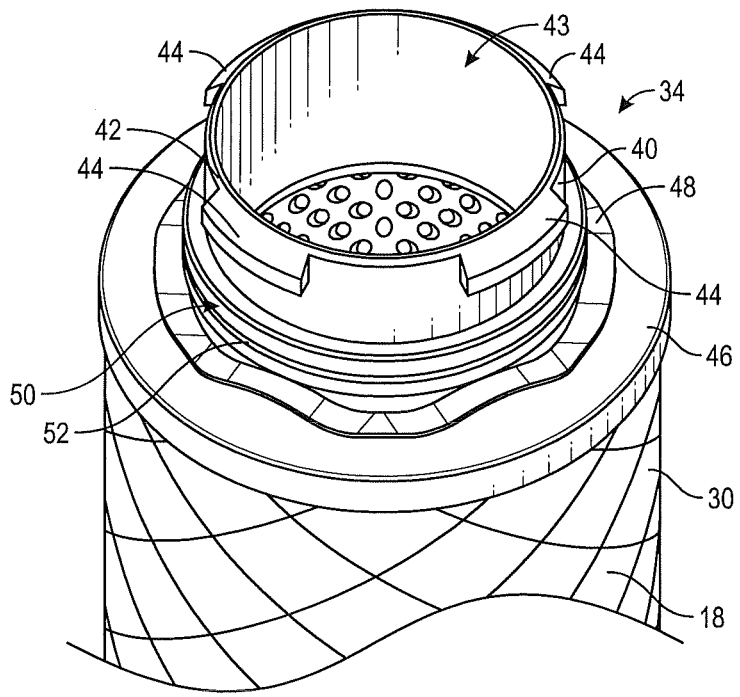
FIG. 7 is an isometric view of a top cap in accordance with another embodiment.

FIGS. 6 and 7 are perspective views of top caps 26 and 34 according to various embodiments. The main difference between the top cap 26 of FIG. 6 and the top cap 34 of FIG. 7 is that the top cap 26 of FIG. 6 is made of plastic and the top cap 34 of FIG. 7 is made of aluminum. As the two embodiments are very similar they will be described together. Any other minor differences will be pointed out below. The top caps 26 and 34 are located at the top and 30 of the filter cartridge 18. The top caps 26 and 34 include an attaching projection 40 which enables the top caps 26 and 34 (and thus the filter cartridge 18) to attach to the cartridge attaching plate 20 (as seen in FIG. 1). The attaching projection 40 helps provide fluid access to the interior 43 of the filter cartridge 18. The attaching projection 40 may include a chamfered edge 42. The attaching projection 40 may also have locking projections 44 located annularly about the attaching projection 40. The locking projections 44 may vary in number in accordance with various installations or embodiments. For example, the amount of locking projections 44 shown in FIGS. 6 and 7 are different. The locking projections 44 may be in a castellated arrangement about the attaching projection 40.

The top caps 26 and 34 also include a top cap face 46 which may include a generally flat portion surrounding the attaching projection 40 as shown. In some embodiments, a wave spring 48 may be located on the top cap face 46 surrounding the attaching projection 40. The attaching projection 40 may include one or more grooves 50. The grooves 50 may contain a resilient material such as, for example, an O-ring 52.

Figure 8:
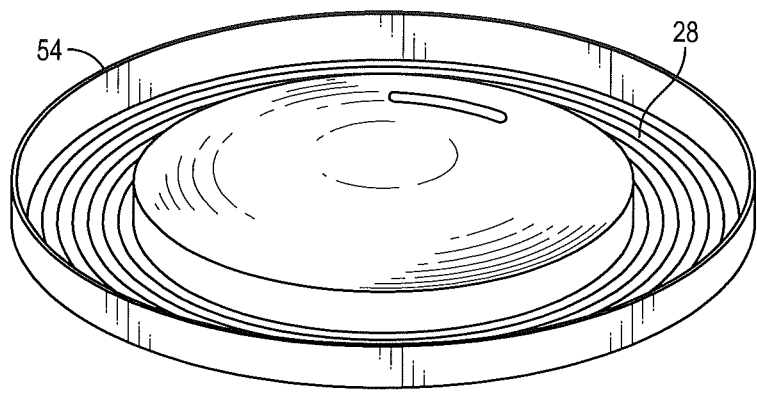
FIG. 8 is an isometric view of a bottom cap of a filter cartridge assembly in accordance with an embodiment.
Figure 9:
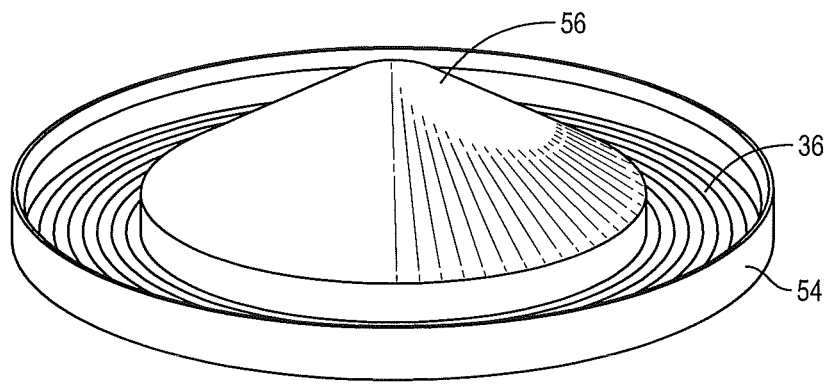
FIG. 9 is an isometric view of a bottom cap of a filter cartridge assembly in accordance with another embodiment.

FIGS. 8 and 9 illustrate bottom caps 28 and 36 in accordance with various embodiments. The bottom caps 28 and 36 may be made of plastic or aluminum respectively. In other embodiments other suitable materials may also be used. Bottom caps 28, 36 may have a raised perimeter 54 which is dimensioned to fit to the permeable sides 24 of a filter cartridge 18. Some embodiments may include a raised center projection 56 as shown.

Figure 10:
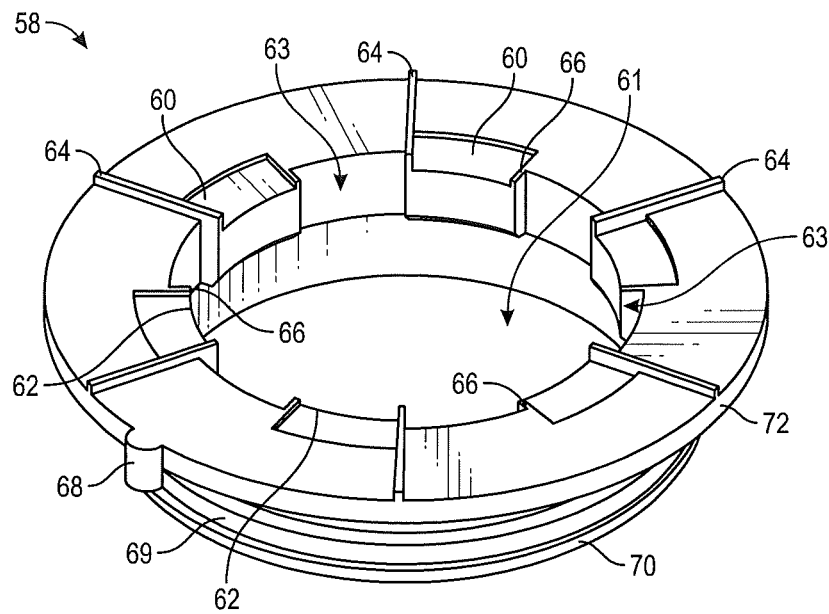
FIGS. 10 and 11 are isometric views of an adapter in accordance with an embodiment.
Figure 11:
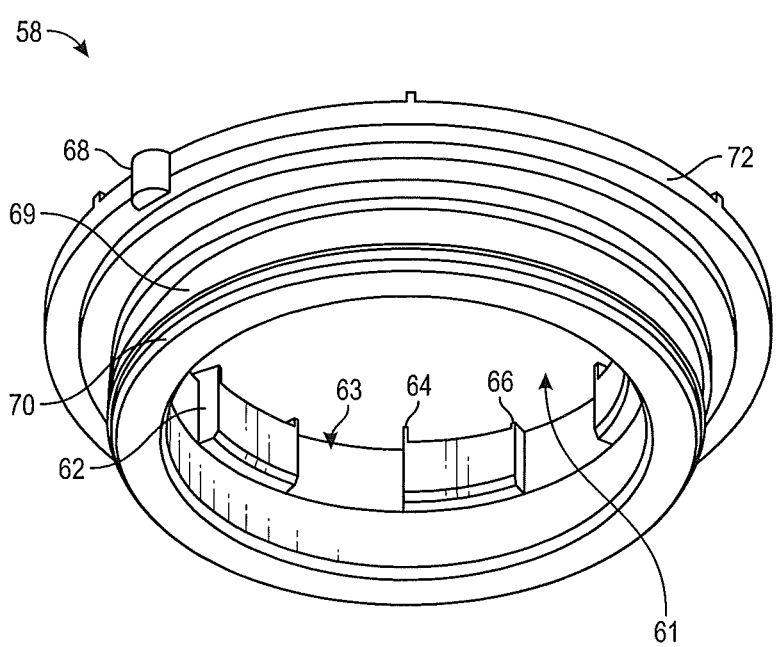
Figure 12:
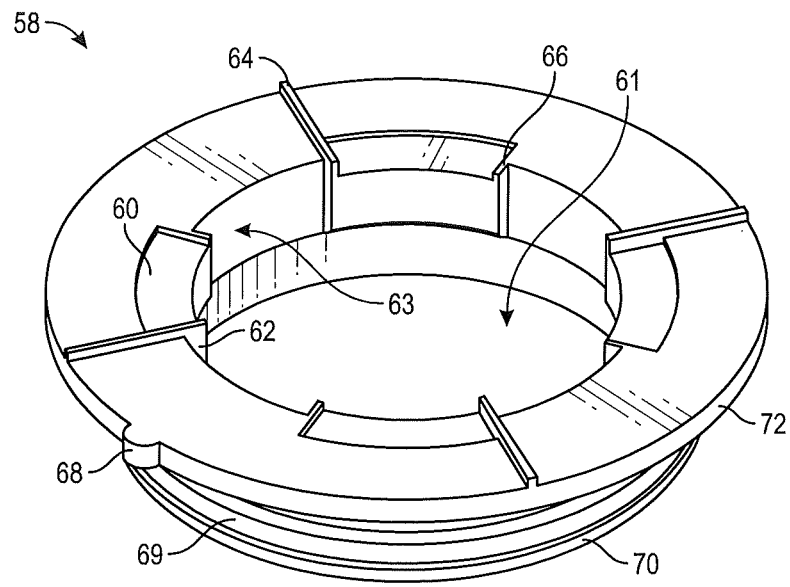
FIGS. 12 and 13 are isometric views of an adapter in accordance with another embodiment.
Figure 13:
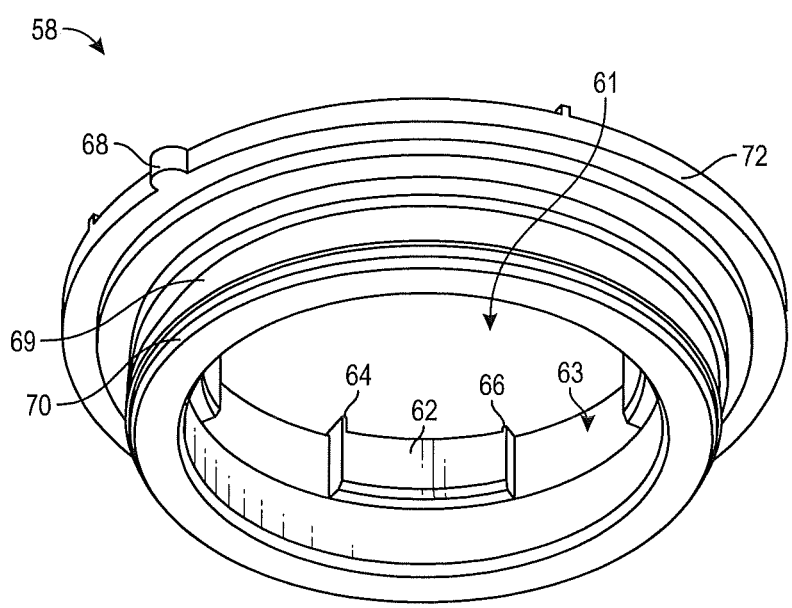

FIGS. 10 and 11 are perspective views taken from different angles of an adapter 58 which is used as an intermediate part between the top cap 26 and the cartridge attaching plate 20 used in accordance with the first embodiment. FIGS. 12 and 13 are perspective views taken from different angles of an adapter 58 which is used as an intermediate part between the top cap 34 and the cartridge attaching plate 20 as used in accordance with the second embodiment shown. The primary difference between the adapter 58 shown in FIGS. 10 and 11 versus the adapter 58 shown in FIGS. 12 and 13 is the number of locking projections 44 the adapter 58 is configured to receive and mate with. As this difference is minor, the adapters 58 shown in FIGS. 10 through 13 will be described together.

The adapter 58 is equipped with multiple seats 60. The seats 60 are located annularly about an interior hole 61 located in the adapter 58. Each seat 60 is configured to be a seat for one of the locking projections 44 shown in FIGS. 6 and 7. The seats 60 include radial projections 62. The radial projections 62 are in a castellated shape so each radial projection 62 alternates with a radial void 63. The radial projections 62 and the radial voids 63 are dimensioned so that when the attaching projection 40 moves up through the center hole 61 the locking projections 44 can move through the voids 63. Once the locking projections 44 clear the adapter 58, the filter cartridge 18 can be rotated and then lowered causing the locking projections 44 to sit upon the seats 60. If the locking projections 44 are attempted to be over rotated, they will be stopped by the first locking ridge 64. A second locking ridge 66 helps keep the locking projections 44 in the seat 60.

The adapter 58 may also include a adapter locking structure 68 which may be, in some embodiments, in the form of locking projections 68. While the adapter locking structure 68 is shown and described herein as a projection, any other suitable locking structure to rotationally lock the adapter 58 to the plate 20 may be used. In the embodiment shown, the locking projection 68 is located on an outer perimeter of the adapter 58. The adapter 58 may also include a sealing groove 69 running annularly around the adapter 58 and an annular retaining groove 70 also running annularly around the adapter 58. In some embodiments and as shown in FIGS. 10 through 13, the adapter 58 may include an annular lip 72 which may, in some embodiments also help define the adapter locking projections 68.

Figure 14:
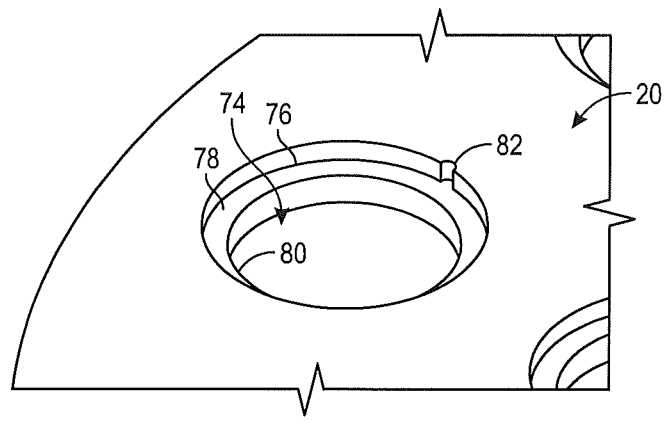
FIG. 14 is a partial close-up view of an attaching plate in accordance with an embodiment.

FIG. 14 is a partial close-up perspective view of a cartridge attaching plate 20. The partial close-up perspective view of the cartridge attaching plate 20 of FIG. 14 is consistent with either attaching plate 20 shown in the embodiment of FIG. 15 or the embodiment of FIG. 16.

Figure 15:
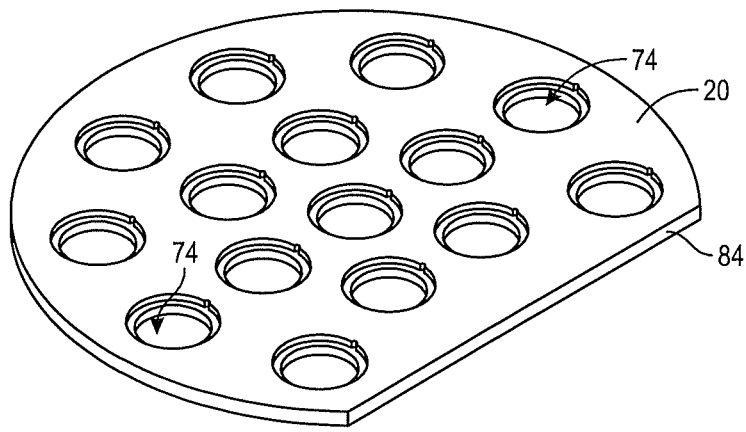
FIG. 15 is isometric view of an attaching plate in accordance with an embodiment.
Figure 16:
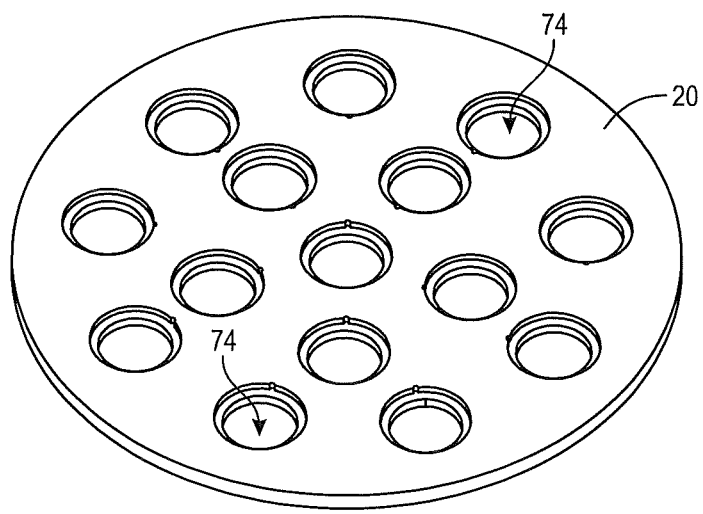
FIG. 16 is isometric view of an attaching plate in accordance with another embodiment.

The attaching plate 20 shown in FIG. 15 is generally a circular plate having one flat side 84. The plate 20 includes plate holes 74. As will be described further below respect to FIG. 17, the filter cartridges 18 are attached to the plate 20 via the plate holes 74. The attaching plate 20 shown in FIG. 16 is similar to the attaching plate 20 of FIG. 15 except for the attaching plate 20 in FIG. 16 is circular and does not have a flat side 84. One of ordinary skill in the art will understand after reviewing this disclosure that various shapes for the attaching plate 20 may be used in accordance with this disclosure. The attaching plate 20 as shown in FIG. 16 also has a plurality of plate holes 74. As shown in FIG. 14 the plate holes 74 include a first diameter hole 76 which forms a ledge 78. The second diameter hole 80 is a through hole. The attaching plate 20 may also include a corresponding locking structure 82 that corresponds with the adapter locking structure 68 as shown in FIGS. 10-13.

Figure 17:
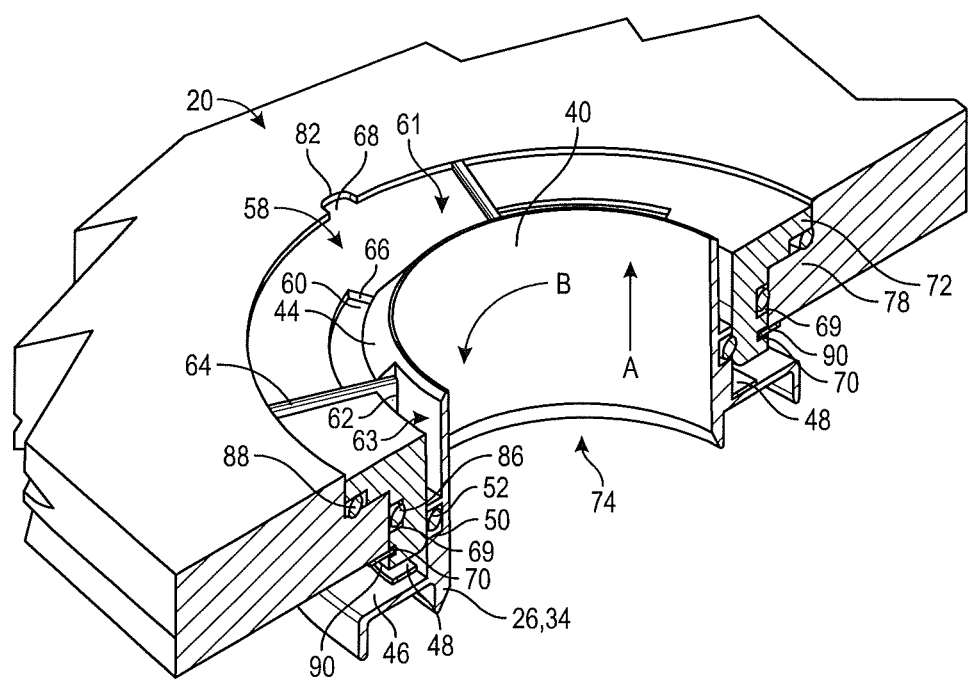
FIG. 17 is a partial isometric cutaway view of a filter cartridge attached to an adapter installed to an attaching plate in accordance with an embodiment.

FIG. 17 illustrates how the filter cartridge 18 attaches to the cartridge attaching plate 20. The adapter 58 attaches to the seal plate 20 and the top cap 26, 34 of the filter cartridge 18 attaches to the adapter 58. The permeable sides and filter media 24 are not illustrated in FIG. 17 to avoid overcrowding of the figure.

The adapter 58 is placed in the plate holes 74 of the seal plate 20 so that the annular lip 72 of the adapter 58 rests on the ledge 78 defined by a termination of the first diameter hole 76. The adapter locking projection 68 is fit into the plate adapter locking structure 82. The fitting of the adapter locking structure 68 into the plate locking structure 82 prevents the adapter 58 from spinning within the plate hole 74. A resilient material 88 such as an O-ring or other resilient material may be placed between the annular lip 72 and the ledge 78. In some embodiments, this resilient material 88 may urge the adapter 58 up and away from the seal plate 20 in the direction illustrated by arrow A. The adapter 58 is held in place and is prevented from moving up out of the seal plate 20 as urged by the resilient material 88 by a retaining ring 90. The retaining ring 90 may simply be a snap ring or any other suitable type retainer may be fitted into the retaining groove 70 of the adapter 58.

Additional resilient material which, in some embodiments, may be an O-ring 86 may be fit to between the sealing plate 20 and the adapter 58 in a annular groove 69 fitted with in the adapter 58. This resilient material 86 may be used to provide a sealing function between the adapter 58 and the seal plate 20. This seal will help prevent unfiltered gas from mixing with the filtered gas.

The top cap 26, 34 is fitted to the adapter 58 by aligning the locking projections 44 with the radial void 63. The top cap 26, 34 of the filter cartridge 18 may then be moved upwards as shown by arrow A so that the attaching projection 40 extends through the center hole 61 in the adapter 58. The attaching projection 40 may extend through the center hole 61 to cause the wave spring 48 to be compressed between the adapter 58 and the top face 46. Then the top cap 26, 34 and filter cartridge 18 may be rotated in the direction illustrated by arrow B so that the locking projections 44 are aligned with the seat 60. The first lock ridge 64 will prevent the locking projections 44 from over rotating. The second lock ridge 66 will assist in maintaining the locking projections 44 located in the seat 60. The top cap 26, 34 may then be moved slightly in the direction opposite arrow A in order for the locking projections 44 to be seated into the seat 60. In some embodiments, the wave spring 48 will still be slightly compressed when the locking projections 44 are seated into the seat 60.

A resilient material which, in some embodiments, may be an O-ring 52 may be placed within the groove 50 in the attaching projection 40 as illustrated in FIG. 17. This resilient material 52 may be used to help create a seal between the top cap 26, 34 and the adapter 58 thereby sealing filtered gas from unfiltered gas.

While the present description and accompanying figures described specific geometric shapes and locations of grooves, resilient materials, projections, and the like, one of ordinary skill in the art after reviewing this disclosure will understand that these specific locations and geometries, are meant to be exemplary and may be modified and still be within the scope of the present disclosure. For example, greater or fewer locking projections 44 and corresponding seats 60 may be used. Resilient materials may reside in grooves as shown or in grooves located on reverse parts. For example, the groove 50 is illustrated to reside on the attaching projection 40 but that groove 50 may just as easily reside on the adapter 58. Other grooves and projections may also be reversed in some embodiments in accordance with the present disclosure.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An attaching system for a filter cartridge comprising:
   a top cap configured to attach to a filter cartridge;
   a mating projection located on the top cap, the mating projection having a top rim;
   a plurality locking projections projecting radially away from the mating projection, wherein each of the locking projections having a top face beginning at the top rim;

a base portion defining an annularly shaped flat surface surrounding the mating projection on a first side and configured to attach to the filter cartridge on a second side;

an annularly shaped adapter dimensioned to allow the mating projection of the top cap to fit into a hole defined by the adapter;

a first annular groove defined by the adapter;

an attaching plate defining a plurality of holes, each hole of the plurality of holes having a respective first diameter and a respective second diameter wherein each hole is dimensioned to receive the adapter and the attaching plate is configured to receive a plurality of the top caps attached to a respective plurality of the filter cartridges;

a retaining ring located in a second groove of the adapter and a resilient ring seated within the hole on a step portion defined by the change between the first and second diameters of the hole urging the adapter out of the hole wherein the adapter is retained in the hole by the retaining ring, wherein when the top cap is located in the adapter, a spring is compressed and urges the top cap out of the adapter but the top cap is retained within the adapter due to the locking projection on the top cap being seated in a seat of the adapter; and a housing having an inlet and an outlet wherein the housing contains the attaching plate, the plurality of adapters, and the plurality of top caps attached to the plurality of respective filter cartridge.

2. The attaching system of claim 1, further comprising an annular groove located between the base portion and the mating projection.

3. The attaching system of claim 2, further comprising an O-ring located in the annular groove.

4. The attaching system of claim 1, further wherein said spring is a wave spring located on the flat surface of the base portion.

5. The attaching system of claim 1, wherein the top cap is made of aluminum.

6. The attaching system of claim 1, further comprising a seat on the adapter located and dimensioned to receive a locking projection.

7. The attaching system of claim 6, further comprising a first lock ridge located at one side of the seat and a second lock ridge located at the other side of the seat.

8. The attaching system of claim 1, further comprising a resilient member located in the first annular groove of the adapter providing a seal between a locking plate and the adapter.

9. The attaching system of claim 1, further comprising a resilient member located in the annular groove located between the base portion and a mating portion of the top cap.

* * * * *